United States Patent
Bharadwaj et al.

(10) Patent No.: US 9,699,027 B2
(45) Date of Patent: Jul. 4, 2017

(54) BIFURCATED CONTROL AND MANAGEMENT PLANES FOR FIBER CHANNEL NETWORKS

(71) Applicant: Cisco Technology, Inc., San Jose, CA (US)

(72) Inventors: Harsha Bharadwaj, Karnataka (IN); Sunil Varghese, Karnataka (IN); Ankan Ghosh, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 14/493,498

(22) Filed: Sep. 23, 2014

(65) Prior Publication Data

US 2016/0087841 A1    Mar. 24, 2016

(51) Int. Cl.
*G06F 15/177* (2006.01)
*H04L 12/24* (2006.01)
*H04L 29/08* (2006.01)

(52) U.S. Cl.
CPC .......... *H04L 41/0816* (2013.01); *H04L 67/10* (2013.01); *H04L 67/1097* (2013.01); *H04L 67/303* (2013.01)

(58) Field of Classification Search
CPC ............... H04L 61/103; H04L 12/5692; H04L 41/0893; H04L 45/14; H04L 49/70;
(Continued)

(56) References Cited

U.S. PATENT DOCUMENTS

2005/0013322 A1* 1/2005 Yamagishi ........ H04L 12/40058
370/468
2006/0177063 A1* 8/2006 Conway .................. H04L 63/02
380/270
(Continued)

OTHER PUBLICATIONS

Cisco, "Data Center Interconnect: Layer 2 Extension Between Remote Data Centers", White Paper, 2010, pp. 1-29.
(Continued)

*Primary Examiner* — Arvin Eskandarnia
*Assistant Examiner* — Thao Duong
(74) *Attorney, Agent, or Firm* — Edell, Shapiro & Finnan, LLC

(57) ABSTRACT

Techniques are provided for bifurcating database information that might otherwise be replicated on each switch in a switched fabric of a Storage Area Network (SAN). The database is divided into a control plane database that comprises mostly switch specific data and a central management database that comprises user device configurations and device profiles. The control plane database includes information such as name server and zone server information, for those devices that may locally log into the switched fabric via a given switch, and those remote devices that are zoned with those local devices and that may log into the switched fabric via another switch. The central management database includes global information for the switched fabric and device profile information (e.g., login interface, Virtual SAN membership, device aliasing, etc.) for devices that have access to the switched fabric and that can also be requested by the various switches in the switched fabric.

24 Claims, 10 Drawing Sheets

(58) Field of Classification Search
CPC ............. H04L 12/4641; H04L 12/6418; H04L 41/0806; G06F 9/455; G06F 9/45533; G06F 11/3006; G06F 11/2007; G06F 11/2025; G06F 11/2033
See application file for complete search history.

(56) References Cited

U.S. PATENT DOCUMENTS

| | | | | |
|---|---|---|---|---|
| 2012/0179838 | A1* | 7/2012 | Tanimoto | H04L 12/4675 709/238 |
| 2012/0254554 | A1* | 10/2012 | Nakajima | G06F 3/0607 711/154 |

OTHER PUBLICATIONS

Cisco, "Cisco Delivers Enterprise-Class Next-Generation Acceleration Solution for Disaster Recovery and SAN Extension", White Paper, 2009 Cisco Systems, pp. 1-4.
Cisco, "A Day in the Life of a Fibre Channel Frame" Cisco MDS 9000 Family Switch Architecture, White Paper, 2006 Cisco Systems, pp. 1-22.

* cited by examiner

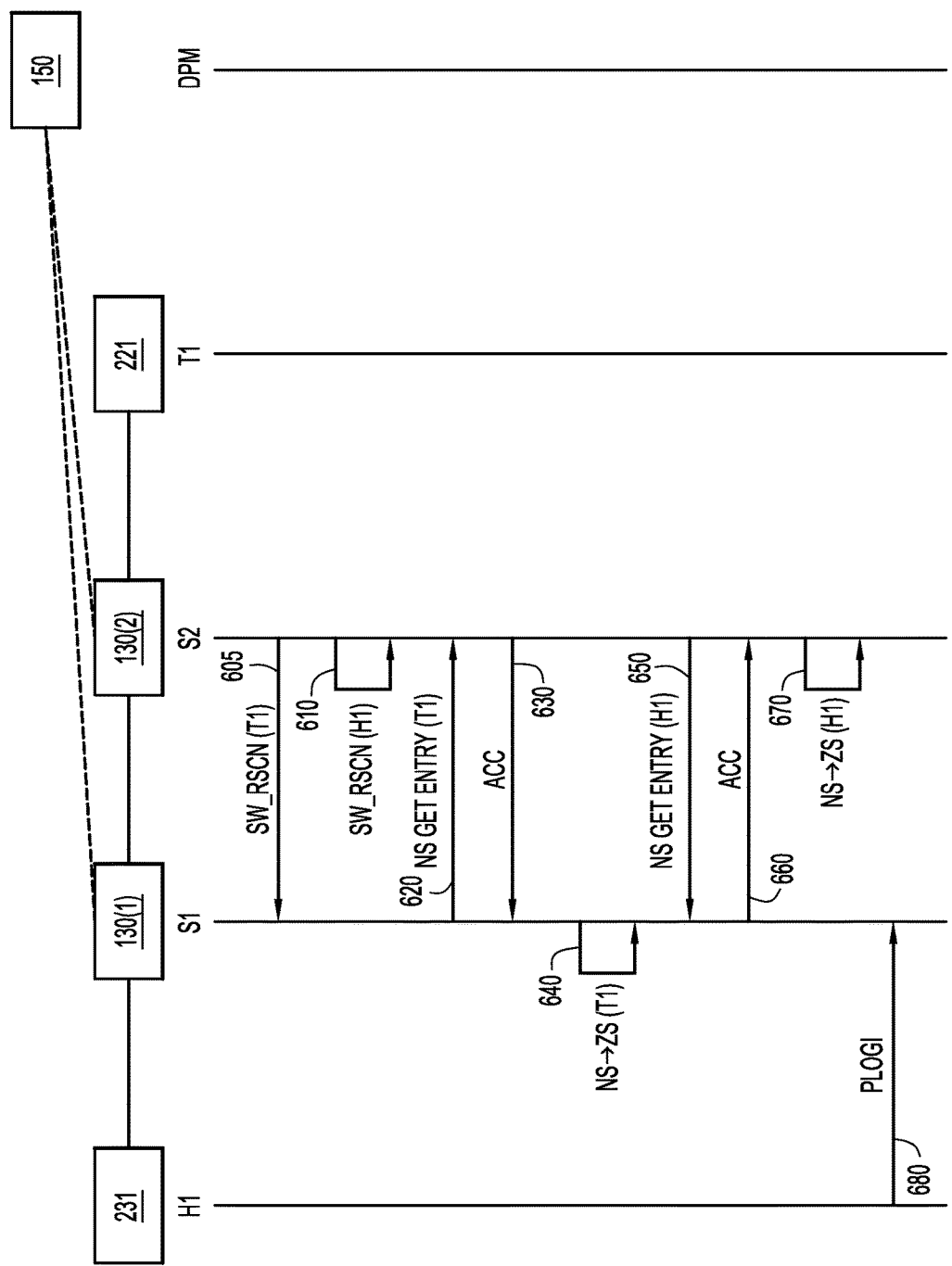

BIFURCATED CONTROL AND MANAGEMENT PLANES FOR FIBER CHANNEL NETWORKS

TECHNICAL FIELD

The present disclosure generally relates to Storage Area Networks (SANs) and more particularly to decoupling the management and control planes for Fiber Channel (FC) switches in a SAN.

BACKGROUND

Storage Area Networks (SANs) reliably store large amounts of data for an organization. Clusters of storage devices, e.g., FC storage arrays and servers, in one location are called SAN islands and communicate using the FC Protocol. Users accessing a SAN typically reside on an Ethernet based Local Area Network (LAN) at another location that may be coupled to an FC server cluster for communication with the FC storage array. To mediate communication between the FC server cluster and the FC storage array, an FC switch network (also called "switched fabric") is employed.

With the advent of virtualization and cloud computing, an ever growing number of virtual machines (VMs) are employed in the network to provide not only end user application services, but growing amounts of provider services such as firewalls, acceleration and compression services, among others. As the number of network devices grows, whether hardware or virtual, the management and control planes do not scale easily either with the growth or with each other. These scaling issues create operational challenges that can benefit from newer approaches to the management and control plane database management.

BRIEF DESCRIPTION OF THE DRAWINGS

FIG. 6 is an example ladder diagram generally depicting messaging that occurs after fabric login and leading up to port login according to the techniques described herein.

DESCRIPTION OF EXAMPLE EMBODIMENTS

Overview

Techniques are provided herein for a first switch in a storage area network switched fabric to receive a message comprising an active zoning configuration for the first switch from a central management device, where the active zoning configuration is stored in a management plane database on the central management device and comprises information for local devices that can login to the first switch and remote devices that can login to the switched fabric via a second switch. The active zoning configuration is stored in a control plane database on the first switch. A fabric login request is received from a local device and it is determined whether the local device is zoned based on the control plane database. Responsive to the fabric login request and the local device being zoned, a local device profile request message is sent to the central management device comprising information configured to request a device profile for the local device. The local device profile is received from the central management device and stored in the control plane database in order to complete the fabric login request. An update message is sent to the central management device comprising information configured to update the management plane database with the status of the local device as being present in the switched fabric.

Example Embodiments

Figure 1:
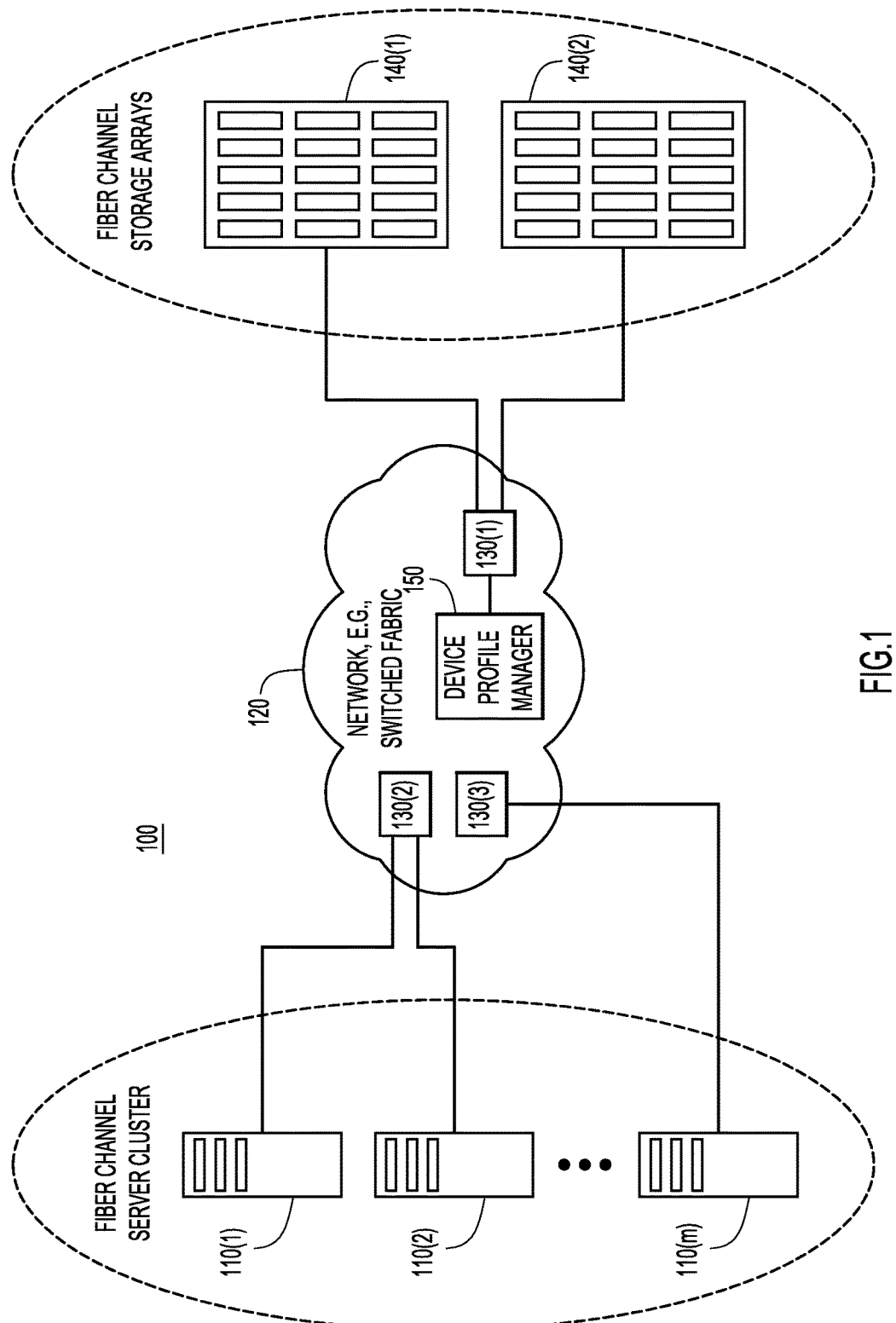
FIG. 1 is an example of an FC computing environment for use with the techniques described herein.

Referring first to FIG. 1, an example system 100 is shown. System 100 comprises a Fibre-Channel (FC) server cluster with FC physical servers 110(1)-110(m), a FC network (also referred to herein as a "switched fabric") 120 comprising a plurality of switches S1-S3, examples of which are shown at reference numerals 130(1)-130(3), a plurality of FC storage arrays, examples of which are shown at 140(1) and 140(2), and a device profile manager (DPM) 150. Devices in system 100 may be identified by way of an FC identifier (FCID) for the exchange of FC encapsulated data. Each of the FC servers 110(1)-110(m) and the FC storage arrays 140(1) and 140(2) has an address that is assigned by the respective connecting switch that contains a 24-bit FC identifier (FCID). A device profile may include configuration information and runtime information. The configuration information may include zone information, a Virtual SAN (VSAN) the device can login to, device alias, etc. The runtime information may include presence information (e.g., which domain/prefix fabric login occurred), some of the NS registered attributes (e.g., host, target or both).

The FCID may be separated into three bytes in a Domain.Area.Port notation that may be used, e.g., in a frame header to identify source ports of a source device and destination ports of a destination device. The domain byte defines a domain number that is always associated with the respective switch. In this example, communications between FC physical servers 110(1) and 110(2) and switch 130(2) may use one domain value (of the FCID). Thus, connections to switch 130(2) use the assigned domain value. Switch 130(1) and switch 130(3) have domain values different from the domain value of switch 130(2). FCIDs with arbitrary areas and ports are assigned for communications on the various paths shown in FIG. 1.

One or more VMs may be running on each of the FC physical servers 110(1)-110(m). Individual VMs may migrate from server to server. As such, each of the FC servers 110(1)-110(m) needs to access the same set of storage ports so that the VMs can access the same applications and data that they operate on in the FC storage arrays 140(1) and 140(2) as they migrate from one FC server to another.

Access to physical servers deployed in a virtualization server cluster may be enabled by way of an access control list (ACL) of the storage array. This may be provided in the form of a Media Access Control (MAC)-based access control, Port World Wide Name (PWWN)-based zoning, or using Logical Unit Number (LUN) masking in the storage array. LUNs provide a way to logically divide storage space. All the servers in a virtualization cluster are typically zoned with the same set of storage ports and they are given access to the same set of LUNs. In this regard, zoning is the access control or separation of traffic between hosts and the resources serving the hosts.

To further illustrate, FC is a standardized transport mechanism for the transfer of data encapsulated in other protocols in a SAN. Devices in a SAN typically communicate via the Small Computer System Interface (SCSI) protocol and FC is used as the transport protocol for SCSI. The FC protocol standard is defined by T11 in several specifications like FC-FS (framing and signaling), FC-LS (line/link service), FC-GS (generic services), FC-SW (switched fabric), etc., which define the FC-0 through FC-4 layers (e.g., that loosely correspond to the lower layers of the Open Systems Interconnect (OSI) model).

The Zone Server (ZS) is a protocol defined by the T11 standards. The ZS is a user configured database that defines access control among the devices (i.e., which servers/hosts can talk to which targets). The ZS database is defined as a synchronized database of zone (connectivity) configurations that can be configured on any switch and then distributed among all the switches for zone enforcement (i.e., each switch maintains a duplicate and synchronized copy of the ZS database). The standards define a zone change protocol which is a four stage change management process defined by various messages for effecting ZS database changes across the SAN. There are also ZS databases merge mechanisms and rules defined by other defined messages when two or more SANs merge.

In addition to the ZS database, an associated Name Server (NS) database may be maintained that provides device information and may use database device name database keys that correlate to records maintained in the ZS database. In this regard, every device in the SAN after login (i.e., Fabric login or FLOGI) may contact the NS on the switch where the device has logged in (i.e., it is a local device with respect to the login switch) in order to find out the other devices that the login device can talk to (e.g., other remote devices logged into the fabric). The NS applies the zoning rules as present in the ZS database and returns the list of devices that the login device is zoned with.

Once device zoning has been confirmed, either the local or remote device can initiate Port login (PLOGI) in order to communicate (e.g., via FC/SCSI data traffic). Since the NS database and the ZS database may comprise mutually inclusive data, the NS database is also traditionally defined as a synchronized database of device login information that can be populated on the local switch, and then distributed among all the other switches. The login information may be used for directory access or zone enforcement (i.e., each switch maintains a duplicate and synchronized copy of the NS database). The ZS and NS databases, being both synchronized and replicated across every switch, comprise data that may not be applicable to a given switch (and therefore require unnecessary DB synchronization messages). For example, information for endpoints may be maintained in the NS/ZS databases on a switch when the endpoints are not logged onto that switch. The information maintained in the ZS/NS database may be referred to herein as control plane information in that the ZS database (and/or the NS database information) controls the interaction between fabric endpoints. The data packets are screened on ingress and/or egress for permission to reach their addressed destination.

Additional protocols, e.g., in addition to ZS protocols, may be used for port security, device aliasing, and dynamic port VSAN membership (DPVM), etc., that associate configuration parameters to a device as activated by the user or administrator, and are maintained as a separate or relational synchronized device databases in every switch for each of these protocols. The vendor or standardized protocols may use existing or vendor defined transport or communication protocols (e.g., Cisco Fabric Services (CFS)). As virtualization and other technologies penetrate the SAN, the number of SAN supported devices, VMs, or endpoints may grow from current levels to 20 thousand (k) to 100 k or more. Current scaling approaches do not scale well beyond 20 k devices.

These current scaling approaches include VSANs (i.e., the logical partitioning of SANs), N_Port Virtualization (NPV) or N_Port ID Virtualization (NPIV). In practice, many operators of large scale SANs typically use, at most, 2 VSANs, while the NPV/NPIV concepts tend to push scaling to the core switches. However, even these scaling approaches tend not to enable SAN scaling beyond 20 k endpoint devices.

In order to support a growing number of SAN endpoints, the user configured databases like the ZS, port-security, device-alias, etc., need to be stored and managed (replicated) on every switch (e.g., director class and fabric class switches), i.e., a database of a size that can support 100 k devices. This large database size has the following negative implications on the switch: it increases load on the system resources like the processor (CPU), memory, persistent storage, Application Specific Integrated Circuit (ASIC) limits, etc.; it increases control plane path traffic resulting in a congested inband path of the switches (e.g., receive (Rx)/transmit (Tx) across the control-plane path); system events such as Inter-Switch Link (ISL) bring up (flap or link state cycling), zone configuration and ZS/NS changes or merges, etc., take larger amounts of time to complete due to the increased processing overhead; synchronized databases imply that the overall SAN device limitation is dictated by the switch with the least capacity (such as a fabric switch), among other drawbacks.

One or more of the above described issues may result in control protocol packets being dropped, thereby never effecting their desired control mechanism. The dropping of control plane traffic can eventually result in device databases that are in an out-of-sync condition with each other. Such out-of-sync databases can impact operation of the SAN itself. Furthermore, increased control traffic on ISL links can consume FC standardized buffer to buffer (B2B) credits that may also impact the data traffic, e.g., by way of data traffic congestion and data packet drops. In some scenarios, system events that take more than a reasonable amount of time to complete may result in certain FC components being declared as failed or otherwise inoperative (e.g., certain components of the switch can be error-disabled (e.g., an FC port or other link, or component).

The techniques described herein mitigate the drawbacks of existing approaches by both distributing the control plane databases as switch specific databases and centralizing management plane database information in a centralize database accessible by the switches in the switched fabric. These techniques are generally described with respect to FC, but are extendable to FC over Ethernet (FCoE) which is understood by those skilled in the art.

As shown in FIG. 1, DPM 150 is associated with or hosted by switch 130(1) since switch 130(1) is connected to the other switches in the switched fabric 120. However, the DPM may be a separate device and/or implemented in another switch, or both, and is further described hereinafter. Moreover, there may be multiple DPMs employed in system 100 or in a DPM cluster. Each switch 130 may employ processes or logic to process messages with regard to managing control plane information for those devices actively zoned via the switch (e.g., to maintain and query the ZS and/or NS database). Separate from the control plane information is the management plane information that is stored on a DPM (e.g., DPM 150).

An example of control plane information that is distributed across a switched fabric (e.g., switched fabric 120) is described in connection with FIG. 2. In the example shown in FIG. 2, three switches 130(1), 130(2) and 130(3) from FIG. 1 are used to switch traffic for a plurality of devices (e.g., either physical or virtual). Switches 130 are coupled by networks links 200(1), 200(2) and 200(3), e.g., data links or ISLs. Switch 130(1) has two target devices T1 and T2 enumerated by reference numerals 221 and 222, respectively. Switches 130(1) and 130(2) each have one host device H1 and H2 enumerated by reference numerals 251 and 252, respectively. The hosts 251 and 252 may be devices that are each running on respective ones of servers 110 in the fiber channel cluster (FIG. 1), e.g., servers 110(1) or 110(m). Targets 251 and 252 may likewise be hosted on one of the fiber channel storage arrays 140. In this regard, the target device may be in the form of a storage device as described above.

Additionally, each endpoint that is logged into a respective switch may be considered to be a local endpoint while an endpoint device logged into another switch and actively zoned with a local device may be considered to be a remote device or endpoint. For example, T1 and T2 are local with respect to S1 and remote with respect to S2 and S3. Similarly, H1 and H2 are local with respect to their login switches S2 and S3, respectively, yet are remote with respect to S1.

Figure 2:
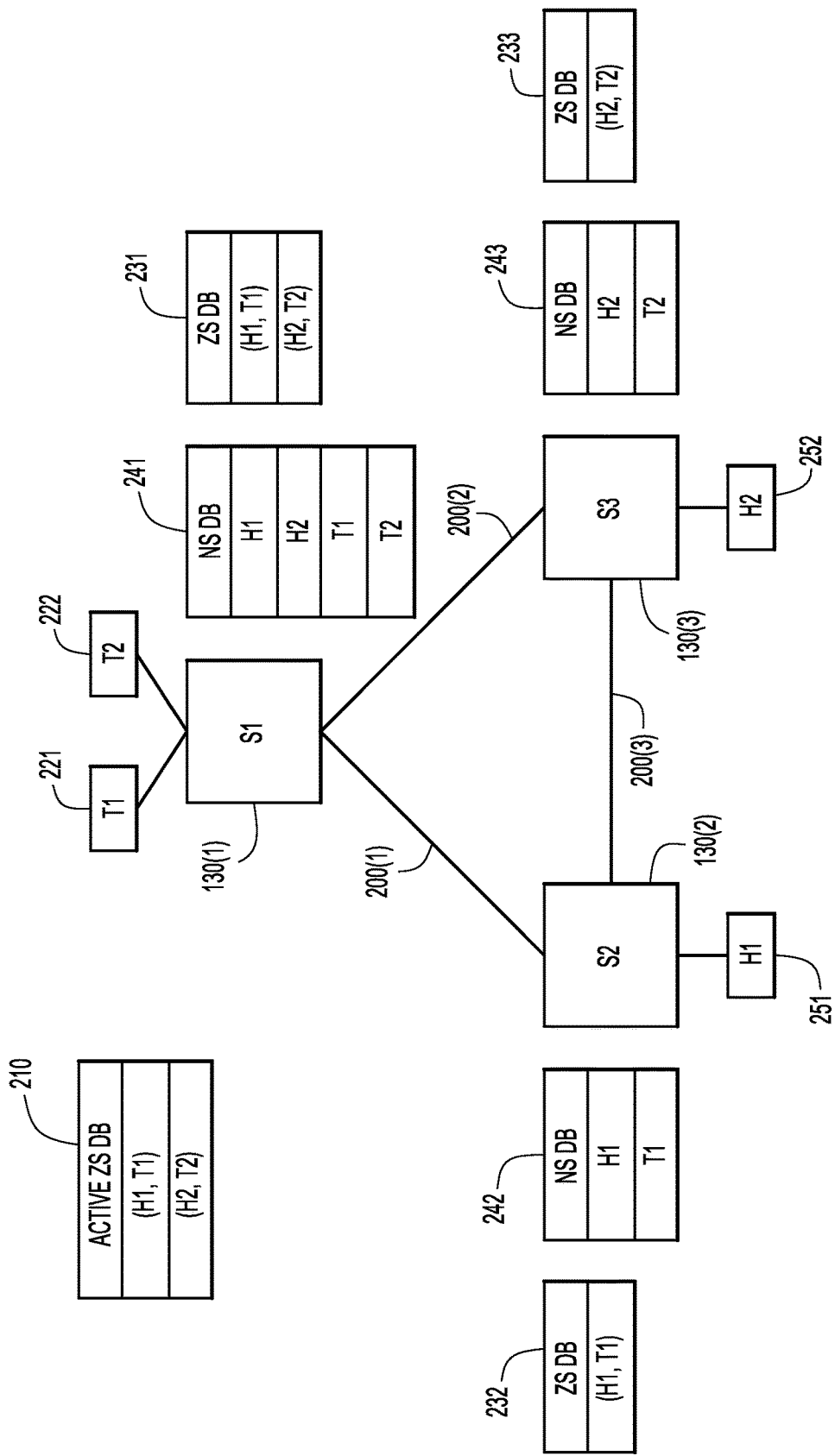
FIG. 2 is an example block diagram of a switched fabric depicted in FIG. 1, where each switch includes a switch specific database that comprises control plane information for the given switch.

FIG. 2 also depicts a number of databases. The databases include active ZS DB 210 and a number of switch specific databases that are not replicated/duplicated as they are in current SAN implementations. These databases include switch specific databases indicated by their locus relative to their respective switch. Switch 130(1) stores switch specific databases ZS DB 231 and NS DB 241, switch 130(2) stores switch specific databases ZS DB 232 and NS DB 242, and switch 130(3) stores switch specific databases ZS DB 233 and NS DB 243.

By way of example the active ZS DB 210 defines all active zones within the switched fabric (e.g., switched fabric 120), while the ZS DBs 231, 232 and 233 comprise subsets of active ZS DB 210 pertinent to the associated switch for which ZS DBs 231, 232 and 233 are stored. In this example, the active ZS DB 210 may be stored in the DPM 150 as a global DB for the fabric, and in a similar fashion, a global NS DB may also be stored in the DPM 150 to facilitate switch specific DB authentication, and the adding of new switches and devices to the fabric. The same criteria apply to the switch specific NS DBs 241, 242 and 243 that are stored on respective switches. Accordingly, each switch 130 stores only those ZS and NS databases that are necessary for that switch. This is in contrast to a switched fabric approach whereby each of the ZS and NS databases are duplicated by messaging or DB replication to be the same on each of the switches 130. Such a switch specific scheme has also been applied to device specific configurations that are stored in duplicate on each switch and incurs some of the same drawbacks described above that result from any active zoning changes, as well as for any device logins or logouts.

The active zoning configuration, e.g., as defined by a user or system operator, is stored in the active ZS DB 210. Active ZS DB 210 indicates that H1 and T1 are actively zoned together and that H2 and T2 are actively zoned together. Only those endpoints that are actively zoned together can communicate. For example, T1 and H1 can exchange data, but if H2 attempted to communicate with T1, then that requested/attempted communication would be blocked or the associated data packets would be discarded since H2 and T1 are not actively zoned.

Figure 3:
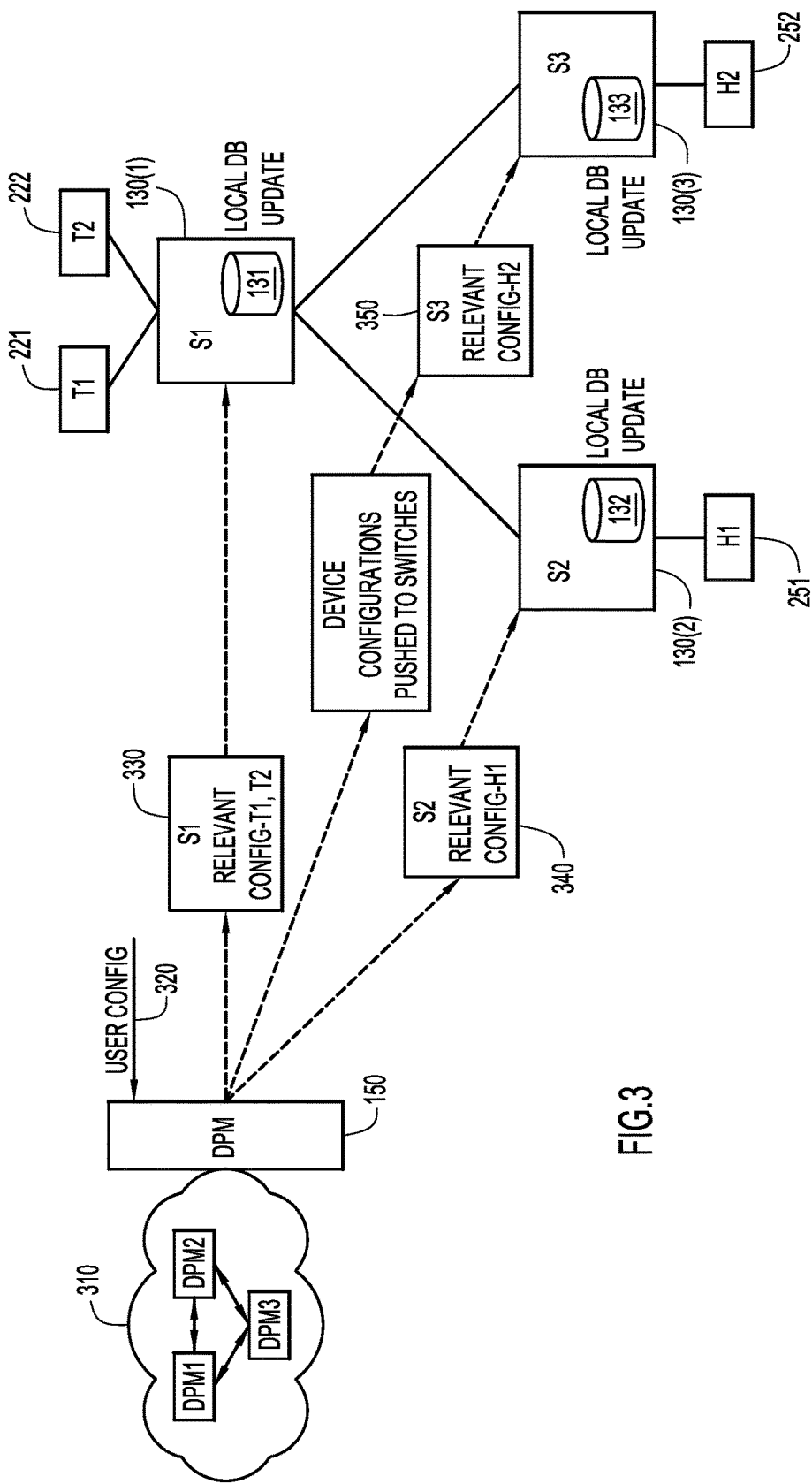
FIG. 3 is an example block diagram of the switched fabric depicted in FIG. 2 with a centralized management device that includes a device specific management plane database.

Since the control plane information and management plane information have been divided or bifurcated into separate or non-collocated databases, and the distribution of ZS/NS control plane data has been describe above, the techniques provided herein are now described with respect to the management plane information comprising device specific configuration information in connection with FIG. 3. As mentioned above, the device specific management plane information has also been traditionally replicated on each switch with the corresponding synchronization messaging. FIG. 3 depicts the devices from FIG. 2, as well as additional devices and information. FIG. 3 further includes an optional DPM cluster 310 that can facilitate the DPM 150 for globally managing device specific information, as well as local databases storage facilities 131, 132 and 133 for respective switches 130.

Initially, a user or system administrator loads DPM 150 with the device configurations at 320. Once the device configurations have been loaded into to DPM 150, they may be sent to each switch 130 during a respective FLOGI operation as described below. Accordingly, at 330, the device configurations for targets T1 and T2 are sent to switch 130(1), at 340, the device configuration for host H1 is sent to switch 130(2), and at 350, the device configuration for host H2 is sent to switch 130(3). As indicated at each switch's local database (131, 132 ands 133) are updated with the corresponding device configuration data. As updates or incremental changes to the device configurations are made by the user administrator at 320, those updates are "pushed" (automatically) to respective devices in lieu of being "sent" as part of a FLOGI handshake, e.g., administrator updates are pushed in order to update the local databases 131, 132 and 133 for respective switches 130.

This management DB centralization technique enables the configuration of devices not only to be centralized, but also allows the configuration of plural devices that can use the same or a similar configuration (e.g., as a template) to be efficiently stored in a single location. Furthermore, in order to be centralized, the DPM 150 is "reachable" by each switch in the fabric. Reachability may be achieved using inband FC by the use of a well-known address (WKA) as depicted in FIG. 3. WKAs are FC standardized addresses that are published in the FC physical layer (FC-PH). Reachability may also be achieved using out-of-band signaling, e.g., using an IP connection.

To illustrate some of the advantages described in connection with FIG. 3, a device configuration for devices in a single zone (e.g., the T1/H1 active zone) is shown in Table 1 below. The data in Table 1 may be shared among all switches in a given switched fabric (e.g., all switches 130 in fabric 120). The functionally equivalent data are shared according to the techniques described herein across two device specific data tables as shown in Tables 2 and 3 below. Traditional Table 1 comprises:

TABLE 1

| Globally distributed device configuration | |
|---|---|
| Zone name Z1 vsan 1 | //VSAN 1 zone definition |
| member pwwn h1 | //H1 PWWN ID |
| member pwwn t1 | //T1 PWWN ID |
| Port-security database vsan 1 | //Ports for VSAN 1 |
| pwwn h1 interface fc1/1 | //hardware slot 1/port 1 |
| pwwn t1 interface fc1/2 | //hardware slot 1/port 2 |
| DPVM database | //port virtualization membership |
| pwwn h1 vsan 1 | //H1 to VSAN 1 |
| pwwn t1 vsan 1 | //T1 to VSAN 1 |
| Device alias database | //aliasing DB |
| device-alias host1 pwwn h1 | |
| device-alias target1 pwwn t1 | |

As shown in Table 1, the zone name, port-security, DPVM and device alias settings are all keyed (i.e., a database key) to each other by way of a Port World-Wide Name (PWWN) as defined in the FC standards. In other words, each data entry includes a PWWN. It should be noted that Table 1 depicts a simplified view of the device specific fabric configuration in that it depicts only devices H1 and T1, and not any of the remaining 20 K, 100 k or more potential device configurations. All of the information in Table 1 (and the information for thousands of other devices) would be shared/synchronized via switch link messaging (e.g., via links 200) in a conventional SAN.

This information when stored on more that one switch may be duplicative. For example, switch S3 does not need the configuration parameters for H1 and T1, but would use only the configuration parameters for H2 and T2. The duplicity becomes apparent when considered with respect to the device specific tables that can be stored centrally (e.g., in DPM 150) and distributed locally to each switch. This scenario is shown in Tables 2 and 3 below which depict switch specific data for host H1 and target T1, respectively. Table 2 comprises:

TABLE 2

| Host H1 device specific configuration | |
|---|---|
| Zoned with t1 | //H1 zoned with T1 |
| FLOGI on interface fc1/1 | //FC channel/port |
| VSAN = 1 | //H1 & T1 on VSAN 1 |
| alias = host1 | //alias information |
| present @ (domain/fcid) | //FCID domain |

Table 2 comprises information sent to S2 (switch 130(2)) for device H1. Device H2 may have similar information, but with respect to device T2.

Table 3 comprises:

TABLE 3

| Host T1 device specific configuration | |
|---|---|
| Zoned with h1 | //T1 zoned with H1 |
| FLOGI on interface fc1/1 | //FC channel/port |
| VSAN = 1 | //T1 & H1 on VSAN 1 |
| alias = host1 | //alias information |
| present @ (domain/fcid) | //FCID domain |

Table 3 comprises information sent to S1 (switch 130(1)) for device T1. Device T2 may have similar information, but with respect to device H2. Note that in Tables 2 and 3, the data are device specific, and therefore, do not need to be keyed by PWWN as in Table 1, but instead the device specific data are identified by way of their PWWN.

Given the data in Tables 2 and 3, zone enforcement may be obtained. For example, if the user has configured devices (H1,T1) in the ZS active database, device H1 is secured to interface fc1/1 of a switch with a domain-id=1 in the port-security database, H1 has a device-alias "host1" configured in the device-alias database. Then the device profile of H1 would be {Zoned with T1, can only login on interface fc1/1, with alias="host1", and logged in at domain=1}. Any other login or communications would be denied unless the device's profile is complied with.

Since the information in Table 1 (and the potential 100 k devices) would be shared and synchronized across all switches 130(1)-130(3), and that switch S3 130(3) would not use any information from Table 1, sending Table 1 to S3 becomes a waste of system resources. Furthermore, the quantity of information that would be sent to any given switch S1 or S2 from Tables 2 or 3, respectively, is approximately 50% less than the amount of data in Table 1. As the number of endpoints in system 100 grows and that are supported by switched fabric 120, efficiencies may be obtained by the distribution of management plane endpoint device specific configurations from a central DPM and distributed to the device endpoint's local switch, as opposed to an "all" endpoints configuration.

The DPM cluster 310 may be used for a distributed system in which the management DB is shared among several switches, e.g., End of Rack (EoR) switches. This technique facilitates a high availability (HA) model. For HA every node/endpoint can use a hashing technique to determine a primary and a secondary DPM, e.g., any "consistent hashing" technique may be applied to the endpoint's PWWN. The primary and secondary DPMs may maintain a subset of the management DB and synchronize their data using conventional or new synchronization mechanisms. In one topology with two core EoR switches, one switch may be the primary DPM for a node and the other switch becomes the secondary DPM, and vice versa, depending on the result of the hash. For larger topologies, additional DPMs may be added.

In certain circumstances, a limited number of devices may communicate across multiple data centers in a Data Center Interconnect (DCI) model, e.g., using FC over Internet Protocol (FCIP) links. The administrator can flag such devices such that inter-data center DPM maintenance is kept to a minimum. In other words, the entire management DB is not synchronized across data centers, but only for those devices flagged by the administrator.

Figure 4:
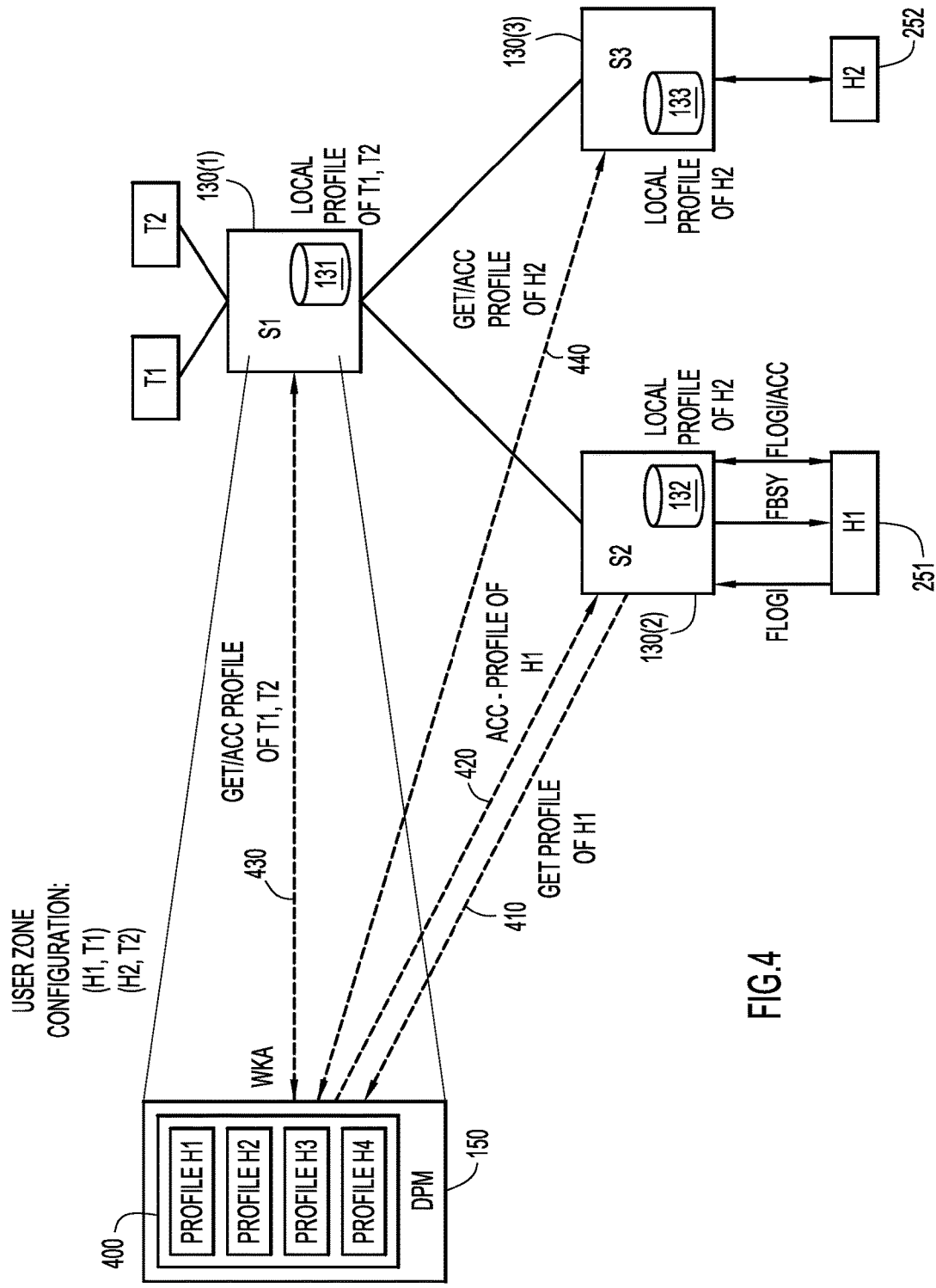
FIG. 4 is an example block diagram of the switched fabric depicted in FIG. 3 where device specific profiles are requested from the centralized management device by a given switch during device login.

Referring now to FIG. 4, the components from FIG. 3 are repeated in order to describe how device profiles are obtained by a given switch for a given endpoint. In this example, DPM 150 has a management DB 400 that includes the device profiles for at least H1, H2, T1 and T2. Consider a FLOGI by host H1, initially when H1 FLOGIs, switch S1 will return a fabric busy (FBSY) signal causing H1 to take pause. In the meantime, at 410, S1 initiates a get profile request to DPM 150. At 420, DPM 150 returns and accept (ACC) message with the device profile for H1, which is then stored in DB 132. After a period of time, H1 FLOGIs for a second time. If S1 has finished processing H1's device profile, then S1 issues a FLOGI accept (ACC) to H1 and H1 is logged in. H1 is now free to communicate with those devices in which H1 is actively zoned via a PLOGI (i.e., PLOGI is sent before any traffic exchange between devices). In a similar fashion, the device profiles of T1 and T2 are obtained at 430, and the device profile for H2 is obtained at 440. Example operations associated with FLOGI and PLOGI operations are described in connection with FIGS. 5 and 6, respectively.

Figure 5:
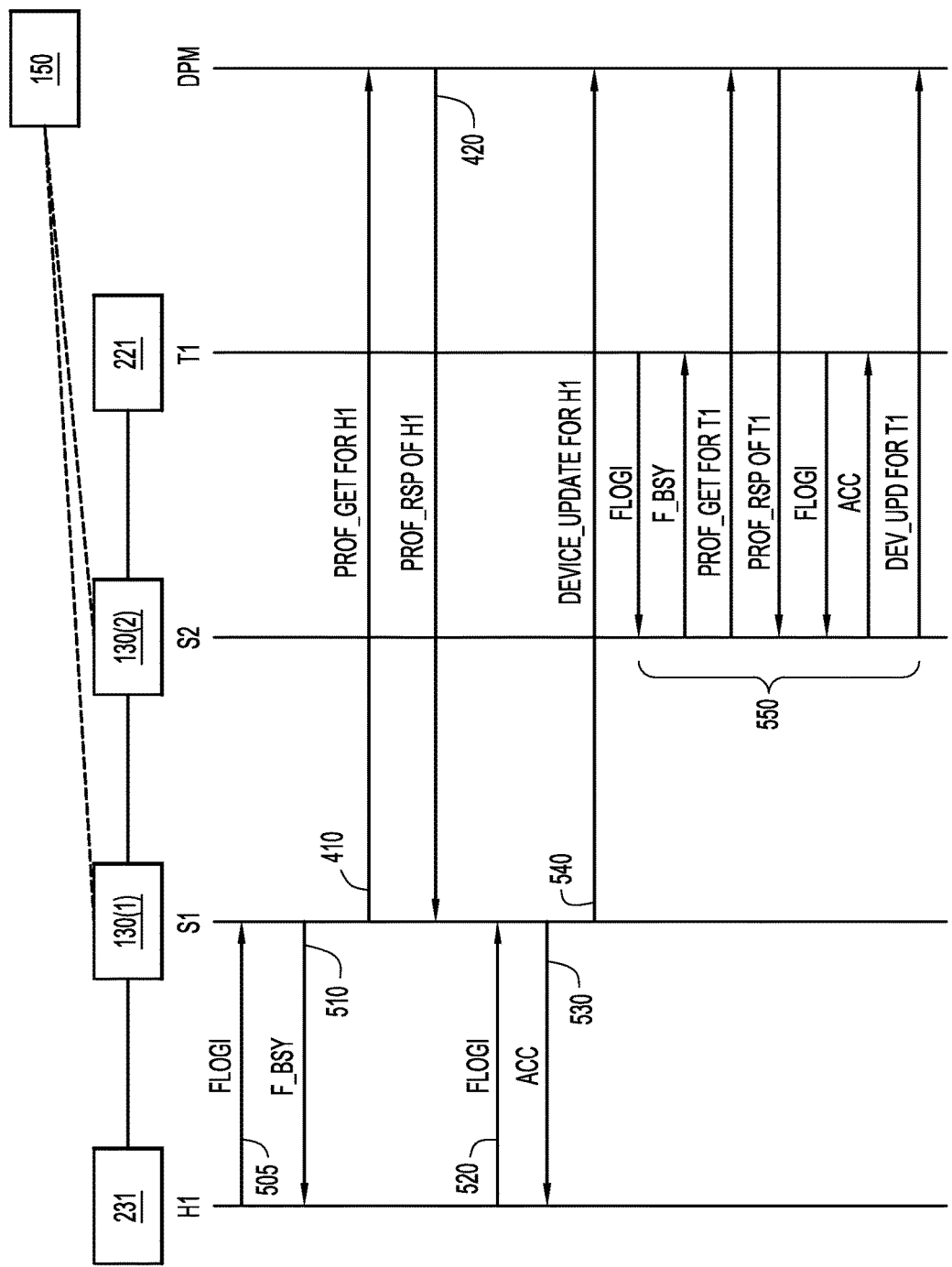
FIG. 5 is an example ladder diagram generally depicting messaging that occurs during fabric login according to the techniques described herein.

FIG. 5 depicts a ladder diagram illustrating FLOGI communications that are used to eventually enable endpoints H1 and T1 to engage in a communication session. Along the top of FIG. 5 are the corresponding devices that are involved in the FLOGI communications, namely, H1 231, S1 130(1), S2 130(2), T1 221 and DPM 150. The passage of time is generally indicated vertically from the top to the bottom of the ladder diagram. It should be noted that in actuality, some messages may occur before or after the order shown.

At 505, H1 initiates a FLOGI to S1. At 510, S1 tells H1 to wait with an FBSY message since S1 does not have the device profile for H1. At 410, S1 requests the device profile for H1 (PROF_GET(H1)) from DPM 150. At 420, DPM 150 responds with the device profile (PROF_RSP(H1)) for H1 and S1, updates its local DB, and enforces the received configuration. After the wait period expires, at 520, H1 attempts a second FLOGI, e.g., a FLOGI resend. At 530, S1 sends the FLOGI to the F-port server and returns a FLOGI ACC message to complete the FLOGI handshake. At 540, the F-port server adds H1 to the NS DB and an H1 present or online message is sent to update the DPM 150. Since H1 is online, but T1 is not yet online a SW_RSCN (switch-registered state change notification message) is not sent to S2. Similarly, T1, S2 and DPM 150 perform analogous messaging for FLOGI as generally depicted at 550.

Absent prior login information, the order in which H1 and T1 FLOGI does not impact the FLOGI process. In the example shown in FIG. 5, H1 logs in first and T1 is not present. Since T1 is not present H1 does not send a SW_RSCN. However, T1 being the second to login receives information in its profile from the DPM 150 that H1 is present on the fabric. Since H1 has updated the DPM 150 with its presence information and that H1 and T1 are zoned together, the DPM 150 can insert information into T1's profile with presence or other information with respect to H1. Hence S2 "knows" H1 is online and can subsequently send a SW_RSCN to S1. This concept is illustrated in FIG. 6.

It is to be understood that the device profile has both configuration information and runtime information. The configuration information may include zone information, a VSAN the device can login to, device alias, etc. The runtime information may include presence information (e.g., which domain/prefix FLOGI occurred), some of the NS registered attributes (e.g., host, target or both). The device profile populates the zone DB, NS DB and other databases on a switch. Further, the switches may publish some of the runtime information (e.g., updated presence information) to the DPM 150 after a device endpoint logs in. Device status updates may also be relayed to the DPM 150.

In another example, instead of at the time of FLOGI sending an FBSY, device profiles can be fetched by sending a FLOGI Accept, requesting the device profile, and sending an RSCN to the device after the profile has been retrieved. In the meantime, NS queries from the device can be set to obtain a NULL device database. Another technique is to fetch the device profile when Target driven Zoning (if enabled) injects the zone into the fabric Turning to FIG. 6, a ladder diagram is described illustrating communications that lead to a PLOGI that are used to enable endpoints H1 and T1 to start a communication session. The ladder diagram in FIG. 6 operates in the same manner as the ladder diagram shown in FIG. 5. At 605, an SW_RSCN(T1) message is sent from S2 to S1 to indicate that T1 is online. As described above, when T1 receives its device profile after FLOGI, the device profile indicates the presence of H1 on the network, which in turn, triggers the SW_RSCN(T1) message. Since switches are designed as forwarding engines, at 610, S2 internally forwards an SW_RSCN(H1) message since H1 is online. The internal SW_RSCN(H1) message causes the NS and ZS databases to be partially populated on S2.

In response to receiving the SW_RSCN(T1) message, at 620, S1 sends a NS Get Entry message to S2. This message requests certain information about T1 that is used to populate the NS databases on S1. At 630, an ACC message is sent from S2 to S1 comprising the information for T1 requested by the NS Get Entry (T1) message. At 640, an S2 internal message is sent (or looped back) from the NS to ZS to allow the ZS DB to be populated with the information about T1. NS and ZS hardware programming for H1 and T1 {H1, T1} can be completed in S1. At this point, the NS and ZS DBs on S2 are partially populated.

Accordingly, at some point after the SW_RSCN(T1) message is received internally by S2, and at 650, S2 sends a NS Get Entry(H1) message to S1 to request certain information about H1 that is used to populate the NS databases on S2. At 660, an ACC message is sent from S1 to S2 comprising the information for H1 that was requested by the GE_PT(H1) message. At 670, an S1 internal message is sent from the NS to ZS to allow the ZS DB to be populated with the information for H1. NS and ZS hardware programming for H1 and T1 {H1, T1} can be completed in S2. At 680, a PLOGI is sent from H1 to T1 in order to complete the communication setup handshake. H1 and T1 are free to exchange data. In some cases, the hardware programming of a switch may not yet be completed and the PLOGI message may be stayed or trapped until such time as the switch programming is complete.

A number of considerations arise with respect to implanting the above-described techniques. For example, RSCN message handling may be modified (e.g., for Domain RSCNs, Fabric RSCNs, Port RSCNs and Port SW-RSCNs), existing database replication communications are turned off and unzoned NS handling may be modified.

Domain RSCNs are sent when a domain is up or down. A Domain up RSCN results in the NS sending NS Get Entry to the remote domain controller to obtain the corresponding list of domain devices. In this model, the local NS first checks if this domain is of interest by checking its device profile. In the NS Get Entry response, either the remote NS or the local NS filters out devices not of interest when adding device to the respective NS database. Fabric RSCNs are sent on Zone Activation so that all affected members can re-query the NS and obtain any zone changes. The sending of a Fabric RSCN is initiated by ZS before the Release Change Authorization (RCA) stage. In this model, the DPM 150 which initiates the configuration change informs the respective client switches to generate a Fabric RSCN. The Fabric RSCN may be generated by the DPM since the DPM orchestrates the configuration change. Port RSCNs are sent to only those devices of interest from the originating switch. Port SW-RSCNs are sent only to those domains (switches) that have devices of interest by checking device profile of the affected port.

Furthermore, with respect to each protocol, whether T11 standardized or not, supported in the manage DB and the control DB, each of these protocols would otherwise have their data in a switch database synchronized among all of the switches in the switched fabric, i.e., an "all data to all switches" configuration. As part of the fabric configuration, the synchronization of data would be turned "on" for all protocols (e.g., ZS, NS, DPVM, device-alias, etc.). With both the bifurcation of a database that was previously in an "all switches" configuration to a switch specific database and a central (or centralized but distributed) database, these synchronization mechanisms are turned "off."

In one example, the zone merge is turned off when an ISL comes up. Since the zone merge is off, a minimum verification of the database(s) on switches at both ends of the ISL is used to ensure that the databases were derived from the same user configured database at the DPM 150. This verification may act as a safeguard against software implementation bugs. A database hash/signature may be exchanged to make sure that the databases at both ends of the ISL were derived from the same database at the DPM 150. If differences in the hash are observed, then both switches may reacquire the latest database from the DPM 150 and attempt a re-verification before the ISL is brought up.

Regarding unzoned NS handling, the FC protocol standards define an unzoned name server request that requires devices to be queried without any zoning restrictions. Since the switch specific NS database is optimized according to the techniques described herein, the NS DB essentially becomes a zoned NS database, and the unzoned name server queries can be forwarded instead to the DPM 150 which, in turn, may forward the unzoned name server queries to respective switches and response data may obtained. For certain NS attributes that may not be available at the DPM 150, an unzoned name server request may be further forwarded to the switch where the device has performed a login. In general, unzoned name server requests are seldom used in any given SAN.

Figure 7A:
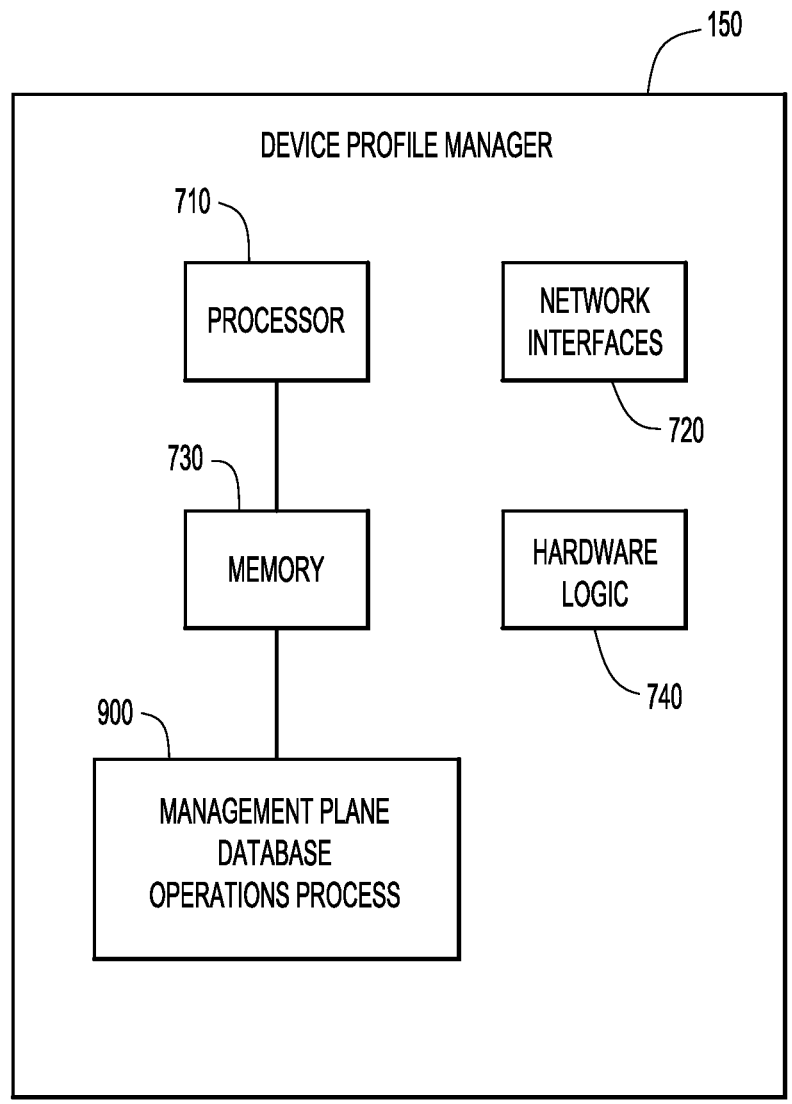
FIGS. 7A and 7B are example block diagrams of the centralized management device and a switch, each being configured to perform functions for the techniques described herein.
Figure 7B:
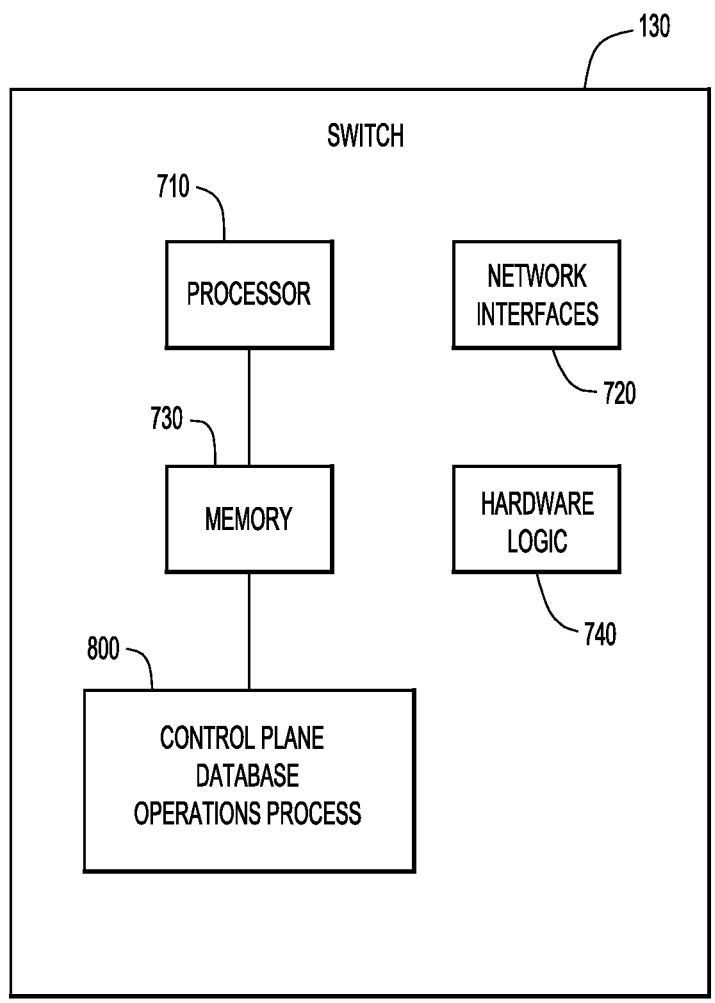

An example architecture of a DPM, e.g., DPM 150, is depicted and described in connection with FIG. 7A, while an example architecture of a switch, e.g., any of switches 130, is depicted in FIG. 7B. Referring to FIG. 7A, DPM 150 comprises a data processing device 710, a plurality of network interfaces 720, a memory 730, and hardware logic 740. Resident in the memory 730 is software for a management plane database operations process 900. Process 900 may also be implemented in hardware using hardware logic 740, or be implemented in a combination of both hardware and software. Process 900 includes operational processes regarding the creation, merging, updating and use of the manage plane DB, as described above, and is further described in connection with FIG. 9.

The data processing device 710 is, for example, a microprocessor, a microcontroller, systems on a chip (SOCs), or other fixed or programmable logic. The data processing device 710 is also referred to herein simply as a processor. The memory 730 may be any form of random access memory (RAM) or other data storage block that stores data used for the techniques described herein. The memory 730 may be separate or part of the processor 710. Instructions for performing the process 900 may be stored in the memory 730 for execution by the processor 710 such that when executed by the processor, causes the processor to perform the operations describe herein in connection with the above figures. The network interfaces 720 enable communication over network 120 shown in FIG. 1, and thus include an FC interface. It should be understood that any of the devices in system 100 may be configured with a similar hardware or software configuration as DPM 150, e.g., switches 130, hosts or targets.

The functions of the processor 710 may be implemented by a processor or computer readable tangible non-transitory medium encoded with instructions or by logic encoded in one or more tangible media (e.g., embedded logic such as an application specific integrated circuit (ASIC), digital signal processor (DSP) instructions, software that is executed by a processor, etc.), wherein the memory 730 stores data used for the computations or functions described herein (and/or to store software or processor instructions that are executed to carry out the computations or functions described herein). Thus, functions of the process logic 300 may be implemented with fixed logic or programmable logic (e.g., software or computer instructions executed by a processor or field programmable gate array (FPGA)).

Hardware logic 740 may be used to implement FC forwarding function and perform hardware programming, e.g., at an ASIC level, without involving the switch Central Processing Unit (CPU), e.g., processor 710, or a separate processor associated with one of the network interfaces 720. The hardware logic 740 may be coupled to processor 710 or be implemented as part of processor 710.

FIG. 7B depicts a similar architecture comparable to that of DPM 150 shown in FIG. 7A for one of switches 130. Switch 130 includes a data processing device 710, a plurality of network interfaces 720, a memory 730, and hardware logic 740. Resident in the memory 730 is software for a control plane database operations process 800. Process 800 may also be implemented in hardware using hardware logic 740, or be implemented in a combination of both hardware and software. Process 800 includes operational processes regarding the creation, merging, updating and use of the control plane DB, as described above, and is further described in connection with FIG. 8.

Figure 8:
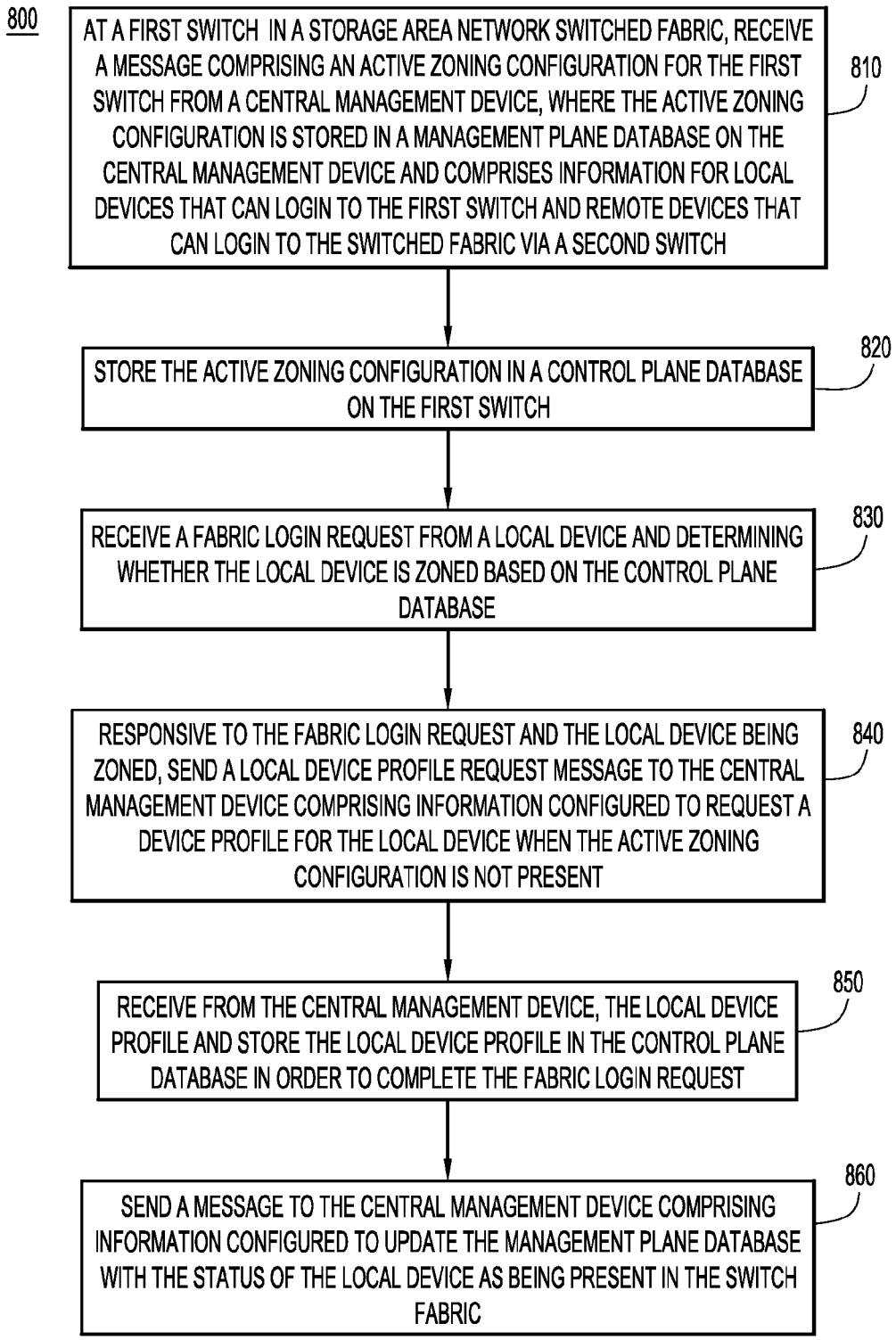
FIG. 8 is an example flow chart generally depicting a control plane database management process performed on a switch according to the techniques described herein.

Referring to FIG. 8, an example of a flowchart is shown that generally depicts the operations of process 800 that facilitates database bifurcation according to the techniques described herein. At 810, at a first switch in a storage area network switched fabric, a message is received comprising an active zoning configuration for the first switch (e.g. any of switches 130) from a central management device (e.g., DPM 150), where the active zoning configuration is stored in a management plane database on the central management device and comprises information for local devices (e.g., hosts or targets) that can login to the first switch and remote devices that can login to the switched fabric via a second switch. At 820, the active zoning configuration is stored in a control plane database on the first switch. At 830, a fabric login (FLOGI) request is received from a local device (e.g., H1 or T1 local to the respective switch 130) and determine whether the local device is zoned based on the control plane database, e.g., active zone DB 210 (FIG. 2). At 840, responsive to the fabric login request and the local device being zoned, a local device profile request (PROF_GET) message is sent to the central management device comprising information configured to request a device profile for the local device, e.g., when the active zoning configuration is not present 8. At 850, the local device profile (PROF_RSP) is received from the central management device and stored in the control plane database in order to complete the fabric login request, and at 860, a message is sent to the central management device comprising information configured to update the management plane database with the status of the local device as being present in the switched fabric.

Figure 9:
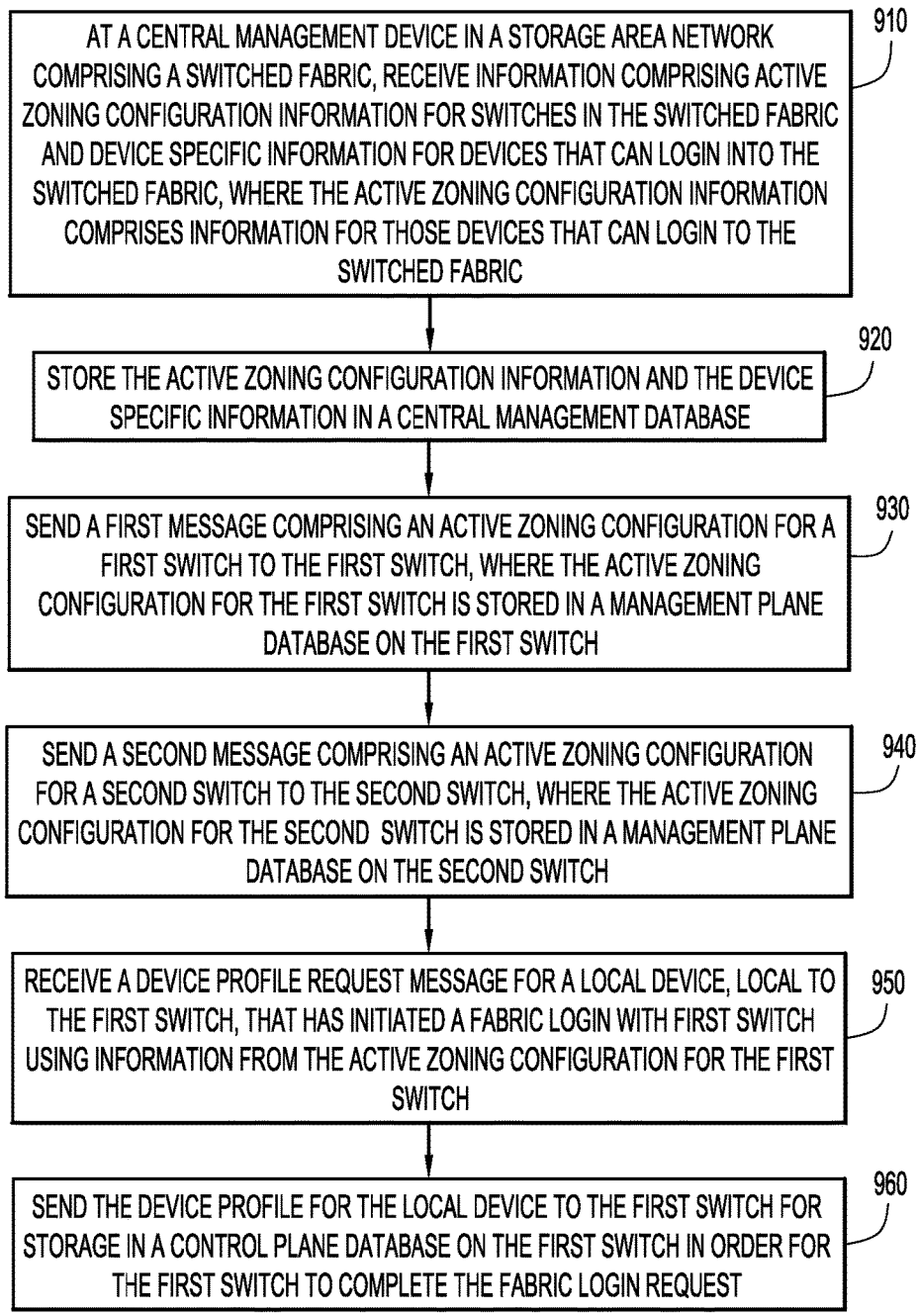
FIG. 9 is an example flow chart generally depicting a management plane database management process performed on a centralized management device according to the techniques described herein.

Turning to FIG. 9, process logic 900 performs complementary operations to switches 130 with respect to the central management device(s), e.g., DPM 150. similar operations on frames sent from the destination device to the source device. At 910, at a central management device (e.g., DPM 150) in a storage area network comprising a switched fabric (e.g., switched fabric 120), information is received comprising active zoning configuration information for switches in the switched fabric and device specific information for devices that can login into the switched fabric, where the active zoning configuration information comprises information for those devices that can login to the switched fabric. At 920, the active zoning configuration information and the device specific information is stored in a central management database. At 930, a first message is sent to a first switch comprising an active zoning configuration for the first switch, where the active zoning configuration for the first switch is stored in a management plane database on the first switch. At 940, a second message is sent to a second switch comprising an active zoning configuration for the second switch, where the active zoning configuration for the second switch is stored in a management plane database on the second switch. At 950, a device profile request message is received for a local device that is local to the first switch, that has initiated a fabric login with the first switch using information from the active zoning configuration for the first switch, and at 960 the device profile for the local device is sent to the first switch for storage in a control plane database on the first switch in order for the first switch to complete the fabric login request.

The techniques described herein have a number of additional considerations that are to be appreciated, namely, SAN merge operations, integration with legacy SANs, and additional DPM considerations. For example, a merge implies that all protocol DBS (both standardized and local/vendor) are merged while the synchronization mechanism are turned off, as described above.

For integration with legacy systems, those fabric switches with older versions of software or third party supplied switches can be connected to the fabric implementing the techniques described herein. For example, a core switch of a legacy fabric may be connected to a DPM switch of a fabric implemented according to the techniques described herein. However, the scale limits overall may be bounded by the dictates of the fabric that does not yet incorporate the techniques described herein, i.e., the older fabric cannot handle 100 k devices. In some circumstance, these connections may not be practical, e.g., in some large topologies, but may be easier to implement in small/medium sized topologies. Some limitations may be mitigated by connecting legacy fabric via DPM hosting switches. In this manner, the DPM can act as a gateway between the old fabric and the new. For example, all user configurations for the merged fabric may be allowed by way of the DPM. The DPM switch(es) may participate in the merge on behalf of new fabric. Configuration database merges (like zone, port-security, etc.) are facilitated by way of the DPM databases. In one example, NS DB synchronization is filtered towards the legacy fabric and may be had using a NS Get Entry mechanism. In this regard, the new fabric may perform selective "Get Entry" based on the profile updates in the post merge from DPM.

Thus, the DPM becomes a convenient repository of complete device configuration and single point of configuration (even across merged fabrics). Typical user configurations like Zone/Zoneset create/activate, port security configure and activate, etc., can be accomplished via the DPM.

The techniques described herein have several advantages. Replication of device configuration/runtime databases is reduced or eliminated. Each switch hosts smaller databases. Control protocols become less chatty and more efficient (e.g., fewer SW-RSCNs, NS Get Entrys, etc.). Switch databases become proportional to logins present on the switch and for zoning configuration. System events like ISL bring up or ISL re-initialization occur more quickly. A centralized user configuration model for the user/administrator is provided by the DPM. A simplified management model aligns with Software Designed Network (SDN) concepts used for Local Area Networks (LANs), e.g., the DPM can be integrated with OpenStack/OpenFlow.

In summary, the techniques described herein vastly reduce the bifurcating database information that that might otherwise be replicated on each switch in a switched fabric of a Storage Area Network (SAN). The database is divided into a control plane database that comprises mostly switch specific data and a central management database that comprises global information and device profiles. The control plane database includes information such as name server and zone server information, for those devices that may locally log into the switched fabric via a given switch, and those remote devices that are zoned with those local devices and that may log into the switched fabric via another switch. The central management database includes global information for the switched fabric and device profile information (e.g., login interface, Virtual SAN membership, device aliasing, etc.) for devices that have access to the switched fabric and that can also be requested by the various switches in the switched fabric.

The above description is intended by way of example only.

What is claimed is:

1. A method comprising:
at a first switch in a storage area network (SAN) switched fabric, receiving a message comprising an active zoning configuration for the first switch from a central management device, wherein the active zoning configuration is stored in a management plane database on the central management device and comprises information for local devices that can login to the first switch and remote devices that can login to the SAN switched fabric via a second switch;
storing the active zoning configuration in a control plane database on the first switch;
receiving a fabric login request from a local device and determining whether the local device is zoned based on the control plane database;
responsive to the fabric login request and the local device being zoned, sending a local device profile request message to the central management device comprising information configured to request a device profile for the local device when the active zoning configuration is not present;

receiving from the central management device, the local device profile and storing the local device profile in the control plane database in order to complete the fabric login request;

sending a message to the central management device comprising information configured to update the management plane database with a status of the local device as being present in the SAN switched fabric;

responsive to the fabric login request, sending a fabric busy message from the first switch to the local device in order to cause the local device to wait for a period of time to allow the first switch to receive the local device profile from the central management device and process the local device profile;

after the period of time, receiving another fabric login request from the local device; and sending a fabric login accept message to the local device when the local device profile has been processed.

2. The method of claim 1, wherein the control plane database comprises information that includes switch specific name server information and switch specific zone server information.

3. The method of claim 1, wherein the management plane database comprises information including device profile information for devices with access to the SAN switched fabric and global name server and zone server information that can be requested by switches in the switched fabric.

4. The method of claim 1, further comprising:
responsive to the fabric login request, sending a fabric login accept message to the local device; and
wherein when the local device profile is received from the central management device, sending a Registered State Change Notification (RSCN) to the local device after the profile has been retrieved.

5. The method of claim 1, wherein the local device profile comprises information indicating that a remote device is present in the SAN switched fabric via the second switch and zoned with the local device, wherein the local device and the remote device can communicate by virtue of being zoned together, the method further comprising:
sending a get profile message to the second switch configured to request profile information for the remote device;
receiving an accept message from the second switch comprising profile information for the remote device; and
updating name server information in the control plane database based on the remote device profile information in the accept message.

6. The method of claim 5, further comprising:
sending a zone server update message internally within the switch for updating zone server information in the control plane database with the name server information.

7. The method of claim 1, further comprising:
receiving a port login message from the local device when the fabric login is complete and a remote device zoned with the local device is present in the switched fabric as indicated by the control plane database.

8. A method comprising:
at a central management device in a storage area network comprising a switched fabric, receiving information comprising active zoning configuration information for switches in the switched fabric and device specific information for devices that can login into the switched fabric, wherein the active zoning configuration information comprises information for those devices that can login to the switched fabric;

storing the active zoning configuration information and the device specific information in a central management database;

sending to a first switch a first message comprising an active zoning configuration for the first switch, wherein the active zoning configuration for the first switch is stored in a management plane database on the first switch;

sending to a second switch a second message comprising an active zoning configuration for the second switch, wherein the active zoning configuration for the second switch is stored in a management plane database on the second switch;

receiving a device profile request message for a local device that is local to the first switch, that has initiated a fabric login with the first switch using information from the active zoning configuration for the first switch; and sending the device profile for the local device to the first switch for storage in a control plane database on the first switch in order for the first switch to complete the fabric login request, wherein, in response to the fabric login, the first switch sending a fabric busy message to the local device in order to cause the local device to wait for a period of time to allow the first switch to receive the device profile for the local device.

9. The method of claim 8, further comprising receiving a device profile request message for a remote device that is local to the second switch and remote with respect to the first switch and that has initiated a fabric login with the second switch using information from the active zoning configuration for the second switch.

10. The method of claim 9, wherein sending the device profile comprises sending information indicating that the remote device is present in the switched fabric via the second switch and zoned with the local device.

11. The method of claim 8, further comprising receiving an update message comprising information configured to update the management plane database with the status of the local device as being present in the switched fabric.

12. The method of claim 8, wherein the management plane database comprises information including device profile information for devices with access to the switched fabric and global name server and zone server information that can be requested by switches in the switched fabric.

13. An apparatus comprising:
one or more network interfaces configured to communicate over a switched fabric in a storage area network; and
a processor configured to be coupled to the one or more network interfaces and configured to:
receive a message comprising an active zoning configuration from a central management device, wherein the active zoning configuration is stored in a management plane database on the central management device and comprises information for local devices that can login to the apparatus and remote devices that can login to the switched fabric via a remote switch;
store the active zoning configuration in a control plane database;
receive a fabric login request from a local device and determine whether the local device is zoned based on the control plane database;

responsive to the fabric login request and the local device being zoned, send a local device profile request message to the central management device comprising information configured to request a device profile for the local device when the active zoning configuration is not present;

receive from the central management device, the local device profile and store the local device profile in the control plane database in order to complete the fabric login request;

send a message to the central management device comprising information configured to update the management plane database with a status of the local device as being present in the switched fabric;

responsive to the fabric login request, send a fabric busy message to the local device in order to cause the local device to wait for a period of time to allow the apparatus to receive the local device profile from the central management device and process the local device profile;

after the period of time, receive another fabric login request from the local device; and send a fabric login accept message to the local device when the local device profile has been processed.

14. The apparatus of claim 13, wherein the control plane database comprises information that includes switch specific name server information and switch specific zone server information.

15. The apparatus of claim 13, wherein the management plane database comprises information including device profile information for devices with access to the switched fabric and global name server and zone server information that can be requested by switches in the switched fabric.

16. The apparatus of claim 13, wherein the processor is further configured to:
responsive to the fabric login request, send a fabric login accept message to the local device; and
wherein when the local device profile is received from the central management device, send a Registered State Change Notification (RSCN) to the local device after the profile has been retrieved.

17. The apparatus of claim 13, wherein the local device profile comprises information indicating that a remote device is present in the switched fabric via the remote switch and zoned with the local device, wherein the local device and the remote device can communicate by virtue of being zoned together, wherein the processor is further configured to:
send a get profile message to the remote switch configured to request profile information for the remote device;
receive an accept message from the remote switch comprising profile information for the remote device; and
update name server information in the control plane database based on the remote device profile information in the accept message.

18. The apparatus of claim 17, wherein the processor is further configured to:
send a zone server update message internally within the apparatus for updating zone server information in the control plane database with the name server information.

19. The apparatus of claim 13, wherein the processor is further configured to:

receive a port login message from the local device when the fabric login is complete and a remote device zoned with the local device is present in the switched fabric as indicated by the control plane database.

20. An apparatus comprising:
one or more network interfaces configured to communicate over a switched fabric in a storage area network; and
a processor configured to be coupled to the one or more network interfaces and configured to:
receive information comprising active zoning configuration information for switches in the switched fabric and device specific information for devices that can login into the switched fabric, wherein the active zoning configuration information comprises information for those devices that can login to the switched fabric;
store the active zoning configuration information and the device specific information in a central management database;
send to a first switch a first message comprising an active zoning configuration for the first switch, wherein the active zoning configuration for the first switch is stored in a management plane database on the first switch;
send to a second switch a second message comprising an active zoning configuration for the second switch, wherein the active zoning configuration for the second switch is stored in a management plane database on the second switch;
receive a device profile request message for a local device that is local to the first switch, that has initiated a fabric login with the first switch using information from the active zoning configuration for the first switch; and
send the device profile for the local device to the first switch for storage in a control plane database on the first switch in order for the first switch to complete the fabric login request,
wherein, in response to the fabric login, the first switch is configured to send a fabric busy message to the local device in order to cause the local device to wait for a period of time to allow the first switch to receive the device profile for the local device.

21. The apparatus of claim 20, wherein the processor is further configured to receive a device profile request message for a remote device that is local to the second switch and remote with respect to the first switch and that has initiated a fabric login with the second switch using information from the active zoning configuration for the second switch.

22. The apparatus of claim 21, wherein the processor is configured to send the device profile information indicating that the remote device is present in the switched fabric via the second switch and zoned with the local device.

23. The apparatus of claim 20, wherein the processor is configured to receive an update message comprising information configured to update the management plane database with a status of the local device as being present in the switched fabric.

24. The apparatus of claim 20, wherein the management plane database comprises information including device profile information for devices with access to the switched fabric and global name server and zone server information that can be requested by switches in the switched fabric.

* * * * *